United States Patent [19]

Kuge

[11] Patent Number: 4,506,966
[45] Date of Patent: Mar. 26, 1985

[54] SHUTTER RELEASE DEVICE FOR AUTOFOCUSING CAMERA

[75] Inventor: Takao Kuge, Hachioji, Japan

[73] Assignee: Konishiroku Photo Industry Co., Ltd., Tokyo, Japan

[21] Appl. No.: 428,263

[22] Filed: Sep. 29, 1982

[30] Foreign Application Priority Data

Oct. 8, 1981 [JP] Japan ................................ 56-159525
Oct. 8, 1981 [JP] Japan ................................ 56-159526

[51] Int. Cl.³ ............................................. G03B 3/10
[52] U.S. Cl. .................................. 354/195.1; 354/400
[58] Field of Search .......... 354/25, 195, 400, 402–409, 354/195.1, 234, 235

[56] References Cited

U.S. PATENT DOCUMENTS

| | | | |
|---|---|---|---|
| 3,479,943 | 11/1969 | Goshima | 354/25 |
| 4,205,906 | 6/1980 | Imura | 354/25 |
| 4,229,089 | 10/1980 | Kitai et al. | 354/25 |
| 4,297,015 | 10/1981 | Matsumoto et al. | 354/25 |
| 4,346,972 | 8/1982 | Takahashi | 354/25 X |
| 4,350,418 | 9/1982 | Taguchi et al. | 354/25 |
| 4,355,872 | 10/1982 | Kitai et al. | 354/25 |
| 4,360,258 | 11/1982 | Hashimoto | 354/195 |
| 4,364,649 | 12/1982 | Mamiya et al. | 354/25 |
| 4,367,935 | 1/1983 | Kuge et al. | 354/25 |

Primary Examiner—John Gonzales
Attorney, Agent, or Firm—Jordan B. Bierman

[57] ABSTRACT

A shutter release device for an autofocusing camera has a release member movable by manual operation from an initial position to a first position, and from the first position to a second position. A first release device connected to the release member releases a focus adjustment mechanism upon movement of the release member to the first position. The focus adjustment mechanism has a first lock device for holding a shutter operating mechanism in a first locked condition, and releases the shutter operating mechanism upon release of the focus adjustment mechanism. A second lock device, controlled by an electromagnet, holds the shutter operating mechanism in a second locked condition, and a second release device actuated by movement of the release member to the second position causes the electromagnet to release the second lock device and thereupon the shutter operating mechanism. Thus, a simple shutter release device is provided for the autofocusing and shutter operating functions using a single control electromagnet.

8 Claims, 2 Drawing Figures

SHUTTER RELEASE DEVICE FOR AUTOFOCUSING CAMERA

BACKGROUND OF THE INVENTION

1. Field of the Invention

This invention relates to an improvement of autofocusing cameras, i.e., cameras such that the focus is automatically adjusted prior shutter release, and more specifically to an improvement of a shutter release device for autofocusing cameras photographing in a manner of variable framing or self-timing can be easily effected when the focus adjustment has been completed. This invention also relates to an improvement of an automatic focus adjusting device for cameras, and more specifically to an automatic focus adjusting device for a camera in which a charger is charged by a motor.

2. Descriptioon of the Prior Art

So-called autofocusing cameras have become popular and there have been proposed various improvements in their functions including an increase of operability, such as the so-called focus lock mechanism in which the focus can be properly adjusted with respect to subjects not only at the center of a frame but also at any desired position in the frame. The most popular type of such focus lock mechanism is so arranged that with a release button being pressed down to the midway point in its stroke, only the focusing operation will be performed and the shutter release operation will not be performed. Only when the release button is fully pressed down is the shutter release operation performed.

Furthermore, the operation modes of the camera in connection with pressing of the release button have come to a have a wide variety of functions with the advent of successive devices to improve the operability of the camera, including the above mentioned focus lock, self-timer, a lock at low brightness as well as a lock upon dissipation of the battery. In other words, there is a tendency toward an increase of operation modes apart from the standard operation mode in which the shutter is simply released upon pressing of the release button.

As operations along with pressing of the release button have become complicated, mechanisms and circuits for the release button have a tendency to be complicated, too.

Heretofore there is known an automatic focusing camera wherein the focus is automatically adjusted upon a release operation and then the shutter is operated. The camera of this kind includes a charger which performs a focus adjustment operation by the biasing force of a spring and also returns the spring. As the focus adjustment operating mechanism is operated in the respective charged states, the charger is provided with a governing means to carry out the precise focus adjustment.

SUMMARY OF THE INVENTION

In view of the foregoing situations, this invention provides a shutter release device for cameras in which the various operation modes along with pressing of a release button can be performed with a simple mechanism.

The invention also provides an automatic focus adjusting device for cameras with a simple construction, in which the driving device is allowed to be driven by utilizing the governing means as a rotation reduction means for the motor.

This invention has the feature that a single electromagnet is used as a control to operate the respective mechanisms for effecting various operation modes in an autofocusing camera. More specifically, according to this invention, the shutter release device for an autofocusing camera is provided such that a first displacement of a release operating member causes a focus adjustment operating member to operate. The charged state of the focus adjustment operating member locking the shutter operating member is released, but the shutter operating member is still locked and prevented from moving to operate the shutter by a second locking member which is operated by the electromagnet.

According to the shutter release device of this invention, the focus adjustment operating member is operated by the first displacement of the release operating member, and the further continued displacement of the release operating member causes the second locking member to be released by the electromagnet. The displacement of the release operating member can thus be held at a stage where the focus adjustment operating member has been operated without operation of the shutter operating member, thus permitting to make the framing variable. Furthermore, a proper delay circuit may be provided to delay activation of the electromagnet circuit, whereby it is possible to depress the release operating member and take a shot in a manner of self-timing with ease. In addition, when the electromagnet can not operate the locking member due to dissipation of the power battery, the same electromagnet can also serve to prevent the displacement of the release operating member by a simple construction.

According to another feature of the invention, the automatic focus adjusting device has a spring-biased driving device for the focus adjustment operating member which is driven by the motor to store a resilient force against a spring for biasing the driving device, and the driving device is operated with the biasing force exerted by the spring to perform the automatic focus adjustment. The transmission system leading from the motor to the driving device has a governing function for controlling the operating speed of the driving device almost at constant, which speed is also determined by the biasing force of the spring.

In the following, this invention will be described with reference to the drawings.

BRIEF DESCRIPTION OF THE INVENTION

FIG. 1 is a schematic arrangement view of a shutter release device according to this invention, and FIG. 2 is a schematic arrangement view showing a control mechanism for driving a motor.

DETAILED DESCRIPTION OF THE PREFERRED EMBODIMENT

Figure 1:
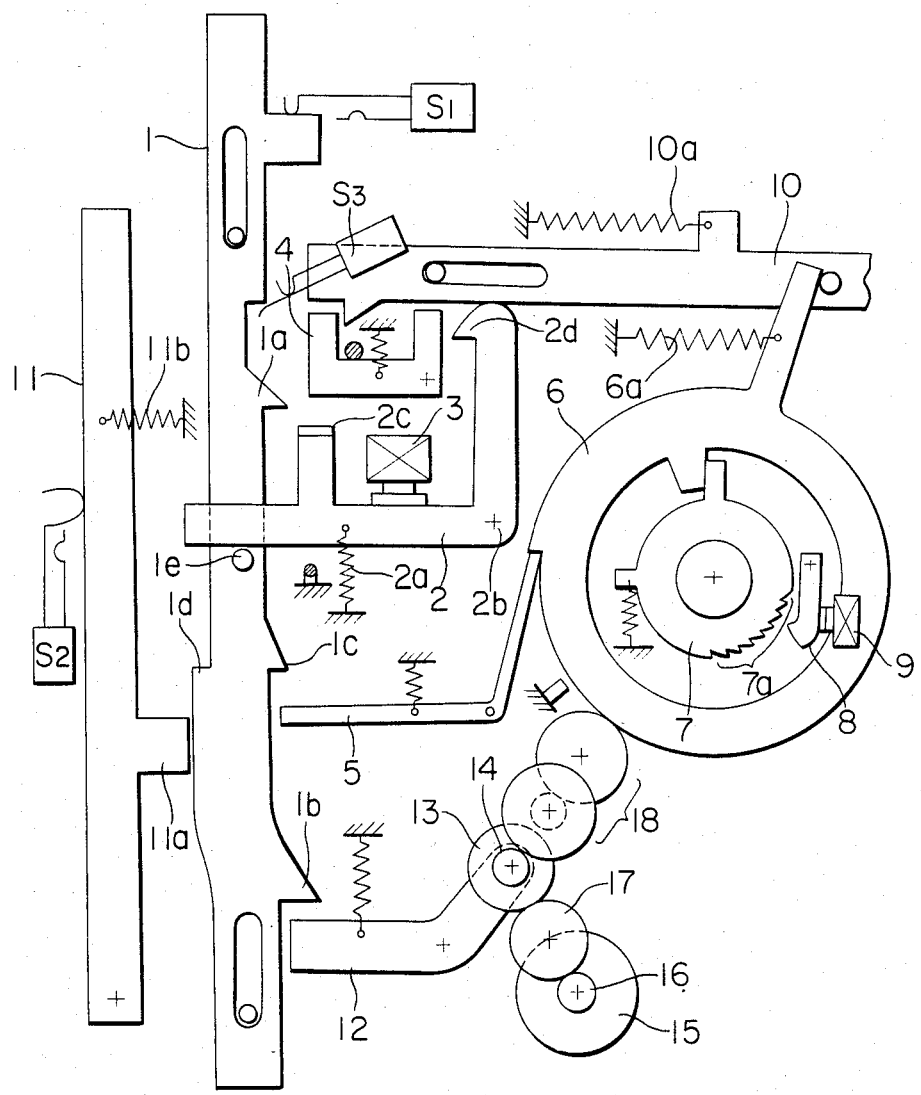

Referring to FIG. 1, the reference numeral 1 denotes a release operating member, 2 denotes an unlocking member, 3 denotes an electromagnet, 4 denotes a shutter locking member, 5 denotes a focus adjustment locking member, 6 denotes a focus adjustment operating member, 7 denotes a focus adjusting ring, 8 denotes a focusing lock pawl, 9 denotes a focusing electromagnet, 10 denotes a shutter operating member, 11 denotes a displacement holding member, 12 denotes a transmission connecting/disconnecting lever, 13 and 14 denote connecting/disconnecting gears integrally formed, 15 denotes a motor, 16 denotes a motor gear, 17 denotes a transmission gear, 18 denotes a governing gear, and S1, S2 and S3 denote switches. The illustrated state represents the charged state before automatic focusing and shutter release will be effected. When the release operating member 1 is displaced downward from the illustrated state against a biasing force of a spring (not shown) the switch S1 is first turned ON and hence the electromagnet 3 is excited so as to hold the unlocking member 2 in the illustrated state.

Now, if a power battery for exciting the electromagnet 3 has been fully dissipated and the electromagnet 3 can not hold the unlocking member 2 properly, the unlocking member 2 will be rotated counterclockwise about its shaft 2b with a biasing force exerted by a spring 2a attached to the unlocking member 2 and then its lock arm 2c comes into engagement with a lock hook 1a of the release operating member 1. Therefore, the release operating member 1 can not be further displaced downward beyond the thus locked position, so that automatic focusing as well as shutter release will never be carried out. It will be understood that an alarm lamp can be easily lit up with an alarm lamp circuit being closed when the lock hook 1a of the release operating member 1 is engaged with the lock arm 2c of the unlocking member 2. By so doing, a photographer is warned of the dissipation of the power battery, thus preventing failure of shots due to the dissipated battery.

As the unlocking member 2 is held in position with the excitation of the electromagnet 3, the release operating member 1 can be pushed down without any obstruction. Then, a connecting/disconnecting hook 1b pushes the transmission connecting/disconnecting lever 12 to be rotated counterclockwise and this causes the connecting/disconnecting gears 13 and 14 to be disengaged from the transmission gear 17 and the governing gear 18. Subsequently, a focus adjusting hook 1c pushes the focus adjustment locking member 5 to be rotated counterclockwise, so that the focus adjustment operating member 6 becomes free from its locked state. Upon this, the focus adjustment operating member 6 is rotated counterclockwise with a biasing force exerted by a spring 6a. Such rotation of the focus adjustment operating member 6 continues under the governing action of the governing gear 18. In other words, the governing gear 18 is provided with a known governor mechanism as required. As the focus adjustment operating member 6 is allowed to rotate, a known range finder (not shown) starts its range finding scan. At the time when the focusing position is detected, the focusing electromagnet 9 is excited so that the focusing pawl 8 is brought to fall in a locking toothed portion 7a of the focus adjusting ring 7 following the focus adjustment operating member 6, thereby locking the rotation of the focus adjusting ring 7 at the focusing position. The focus adjustment operating member 6 still continues its rotation until this rotation exceeds the maximum allowable amount of rotation of the focus adjusting ring 7. Furthermore, as the focus adjustment operating member 6 is rotated counterclockwise, the shutter operating member 10 will start to move leftward with a biasing force exerted by a spring 10a, but this leftward movement is blocked by the shutter locking member 4. In the above process, therefore, only automatic focusing has been performed and shutter release is not yet performed. Stated differently, the release operating member 1 is first pushed down to a position where the above process has been finished and held in such state, so that framing can be varied as desired.

Locking of the shutter operating member 10 by the shutter locking member 4 is dismissed in such a manner that the release operating member 1 is further pushed downward. As displacement holding hook 1d moves beyond an engaging arm 11a of the displacement holding member 11, the displacement holding member 11 is allowed to rotate clockwise with a biasing force exerted by a spring 11b, and hence the switch S2 is turned ON thereby to deenergize the electromagnetic 3. More specifically, with the electromagnet 3 being deenergized, the unlocking member 2 is rotated counterclockwise with a biasing force of the spring 2a and its distal operating portion 2d pushes the shutter locking member 4 to be rotated counterclockwise, so that the shutter locking member 4 becomes free from its function to lock the shutter operating member 10. Then, the shutter operating member 10 is moved leftward with a biasing force of the spring 10a so as to cause the shutter (not shown) to undergo its shutter operation. Now, if a delay circuit adapted to delay an ON signal for the switch S2 by a given period of seconds is switchably connected to a circuit for the switch S2, it will become possible to shoot in a self-timing manner with ease.

In this connection, even if the release operating member 1 is liberated from its pushing-down movement at the stage where the release operating member 1 starts to effect shutter release as mentioned above, the displacement holding hook 1d will be caught by the engaging arm 11a of the displacement holding member 11 and hence the release operating member 1 is prevented from restoring to its original position. Such prevention serves to assure that the later described restoring charge by the motor 15 will be started after the shutter operation is completely finished. The above prevention can be dismissed in such a manner that the shutter operating member 10 moves further leftward after operating the shutter and then the distal end of the shutter operating member 10 pushes the displacement holding member 11 to be rotated counterclockwise. Accordingly, the release operating member 1 is restored to the original illustrated position and upon this the transmission connecting/disconnecting lever 12 is also restored so that the connecting/disconnecting gears 13 and 14 come into mesh with the transmission gear 17 and the governing gear 18, respectively. At the same time, the focus adjustment locking member 5 becomes free from a force exerted thereon and the unlocking member 2 is pushed by a pin 1e of the release operating member 1 to be rotated clockwise and then returned to the illustrated position, too.

As the release operating member 1 is completely restored, the switch S3, which has been pushed down and turned OFF up to that time, is now turned ON once again and this causes the motor 15 to start its rotation. The rotation of the motor 15 is transmitted from the motor gear 16 to the focus adjustment operating member 6 via a gear train comprising the transmission gear 17, the connecting/disconnecting gears 13 and 14 and the governing gear 18, thereby to rotate the focus adjustment operating member 6 in a clockwise direction. The focus adjustment operating member 6 is stopped at a position where it is locked by the focus adjustment locking member 5 as illustrated in the drawing.

The manner of driving the motor 15 upon ON-operation of the switch S3 in the restoring stroke will be now described with reference to FIG. 2, which switch is turned ON while the release operating member 1 is in the restored position, turned OFF when the release operating member 1 is pushed downward, and then turned ON once again when the member 1 is completely restored.

Figure 2:
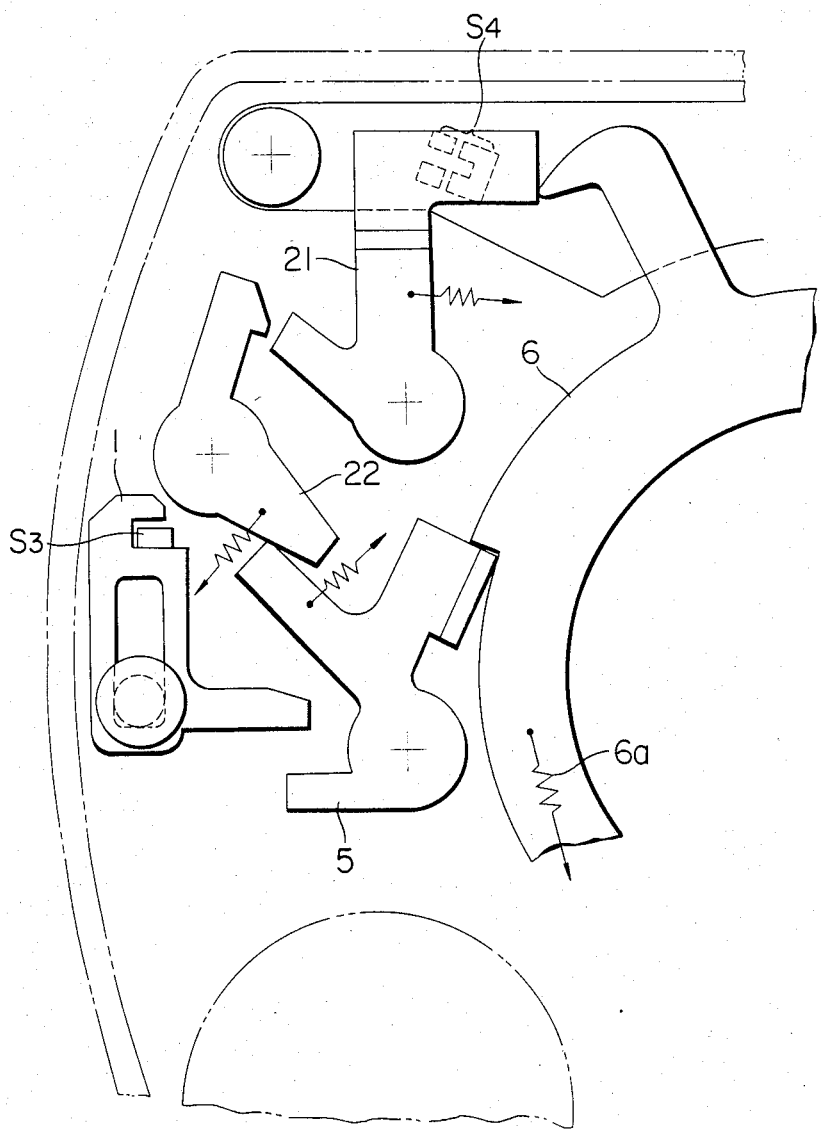

FIG. 2 shows the charged state similarly to FIG. 1 and members with identical functions are denoted by identical reference numbers or symbols. S4 denotes a switch provided in a driving circuit for the motor 15 in series with the switch S3. The switch S4 is turned OFF when a switch operating member 21 is located in the illustrated position, and turned ON when the switch operating member 21 is pushed by the focus adjustment operating member 6 in its counterclockwise rotation and hence rotated counterclockwise against a biasing force of a spring. The reference number 22 denotes an ON holding lever adapted to hold the switch operating member 21 at the rotated state where the switch 54 is turned ON.

In the illustrated charged state, the switch S3 is turned ON but the switch S4 is turned OFF, so that the motor 15 will never undergo its charge rotation. Now, as the release operating member 1 is pushed downward, the switch S3 is turned OFF, the focus adjustment locking member 5 is rotatec counterclockwise so as to become free from its function to lock the focus adjustment operating member 6, and hence the member 6 is allowed to rotate counterclockwise, in the same manner as mentioned by referring to FIG. 1. Such counterclockwise rotation of the focus adjustment operating member 6 pushes the switch operating member 21 to be rotated in the same direction, so that the switch S4 is switched in its state from OFF to ON. Then, the switch operating member 21 is rotated until it will be locked by the ON holding lever 22 which is liberated from a pushing force exerted by the focus adjustment locking member 5 being rotated counterclockwise and which is urged to rotate clockwise by a spring force, and the thus rotated state is held by the ON holding lever 22. Therefore, the switch S4 remains in the ON state. But, the switch S3 is in the OFF state and hence the motor 15 can not be rotated yet. Then, after the shutter operation as stated by referring to FIG. 1, or even before such shutter operation, once the release operating member 1 is restored to the original position, the switch S3 is now turned ON and this causes the motor 15 to start its rotation, whereupon focus adjustment operating member 6 is rotated clockwise for restoration thereof. In the restoring stroke of the release operation member 1, the focus adjustment locking member 5 becomes free from engagement with the release operating member 1 and will start its clockwise rotation with a biasing force of a spring. However, the focus adjustment locking member 5 strikes against the larger diameter portion of the focus adjustment operating member 6 and hence can not rotate fully up to the original state, until the member 6 reaches its original position finally. Thus, the ON holding lever 22 continues to lock the switch operating member 21 with a spring force, so that the switch S4 is held in the ON state. Then the focus adjustment operating member 6 reaches its original position, the focus adjustment locking member 5 is brought to fall in the smaller diameter portion of the focus adjustment operating member and rotated up to the original position, thereby rotate the ON holding lever 22 counterclockwise against the spring force and then make it free from engagement with the switch operating member 21.

Upon this, the switch operating member 21 is rotated clockwise with a biasing force of a spring until its distal end comes into abutment with an operating arm of the focus adjustment operating member 6. At the same time, the switch S4 is turned OFF and hence the motor 15 is stopped in its rotation. With the motor 15 being stopped, the focus adjustment operating member 6 is turned back with a biasing force of the spring and this rotation is restricted by the focus adjustment locking member 5, so that the member 6 is returned to the original charged state completely.

According to the motor driving control mechanism in the above, the motor 15 is immediately stopped in its rotation as soon as the focus adjustment operating member 6 has been brought into the locked state. So it becomes possible to control power dissipation of the power battery at the minimum level as far as required.

In case the shutter has been operated, with the focus adjustment operating member 6 being rotated for the restoration as mentioned above, the shutter operating member 10 shown in FIG. 1 also restores to the illustrated position of FIG. 1 along with the focus adjustment operating member 6. As a result, the whole device is completely returned to the charged state as shown in the figures.

As fully described in the above, this invention is able to provide an autofocusing camera with various useful functions as follows. It becomes possible to take a shot in the manner of variable framing or self-timing with a simple device. Furthermore, a release lock can be effected in the event the power battery has been dissipated. Rearrangement of the focus prior to shutter operation is permitted just by making the release operating member free from its pressed state.

What is claimed is:

1. A shutter release device for an autofocusing camera comprising:
    a. operating means movable from an initial position to a first position, and from said first position to a second position;
    b. first release means connected to said operating means for releasing a focus adjustment member upon movement of said operating means to said first position;
    c. said focus adjustment member having first lock means for holding a shutter operating member in a first locked condition, and for releasing said shutter operating member from said first locked condition upon release of said focus adjustment member;
    d. second lock means controlled by an electromagnet for holding said shutter operating means in a second locked condition; and
    e. second release means actuated by movement of said operating means to said second position for causing said electromagnet to release said second lock means, whereupon said shutter operating member is released for shutter operating movement.

2. The shutter release device of claim 1, further comprising delay means for delaying release by said electromagnet of said second lock means for a predetermined period of time following movement of said operating means to said second position.

3. The shutter release device according to claim 1, further comprising third lock means for preventing movement of said operating means when a power source for said electromagnet has been dissipated.

4. The shutter release device according to claim 3, wherein said third lock means comprises a detent on said operating means, and said third lock means being biased to engage said detent when said electromagnet is not operated due to dissipation the said power source.

5. The shutter release device according to claim 1, further comprising driving means including a motor connected through a gear to said focus adjustment member for restoring said focus adjustment member to a charged state for successive operation of said operating means.

6. The shutter release device of claim 5, further comprising a speed control mechanism connected to said gear for controlling the speed of movement of said focus adjustment member upon the release thereof.

7. An automatic focus adjusting device for a camera comprising an operating member and a focus adjustment member, said focus adjustment member being initially in a charged state against a resilient force of a biasing member, and being released for a focus adjusting movement under the biasing force exerted by said biasing member upon operation of said operating member to thereby perform automatic focus adjustment, and driving means including a motor for restoring said focus adjustment member to its initial charged state against the force of said biasing member upon completion of said focus adjusting movement, said driving means further including a transmission member for controlling the speed of said focus adjustment movement so that it is substantially constant.

8. The automatic focus adjusting device of claim 7, wherein said transmission member is a rotation reduction device connected between said motor and said focus adjustment member.

* * * * *